Sept. 30, 1930.  C. E. CARPENTER  1,776,781
DOUGHNUT MACHINE AND THE LIKE
Filed July 13, 1929   2 Sheets-Sheet 1
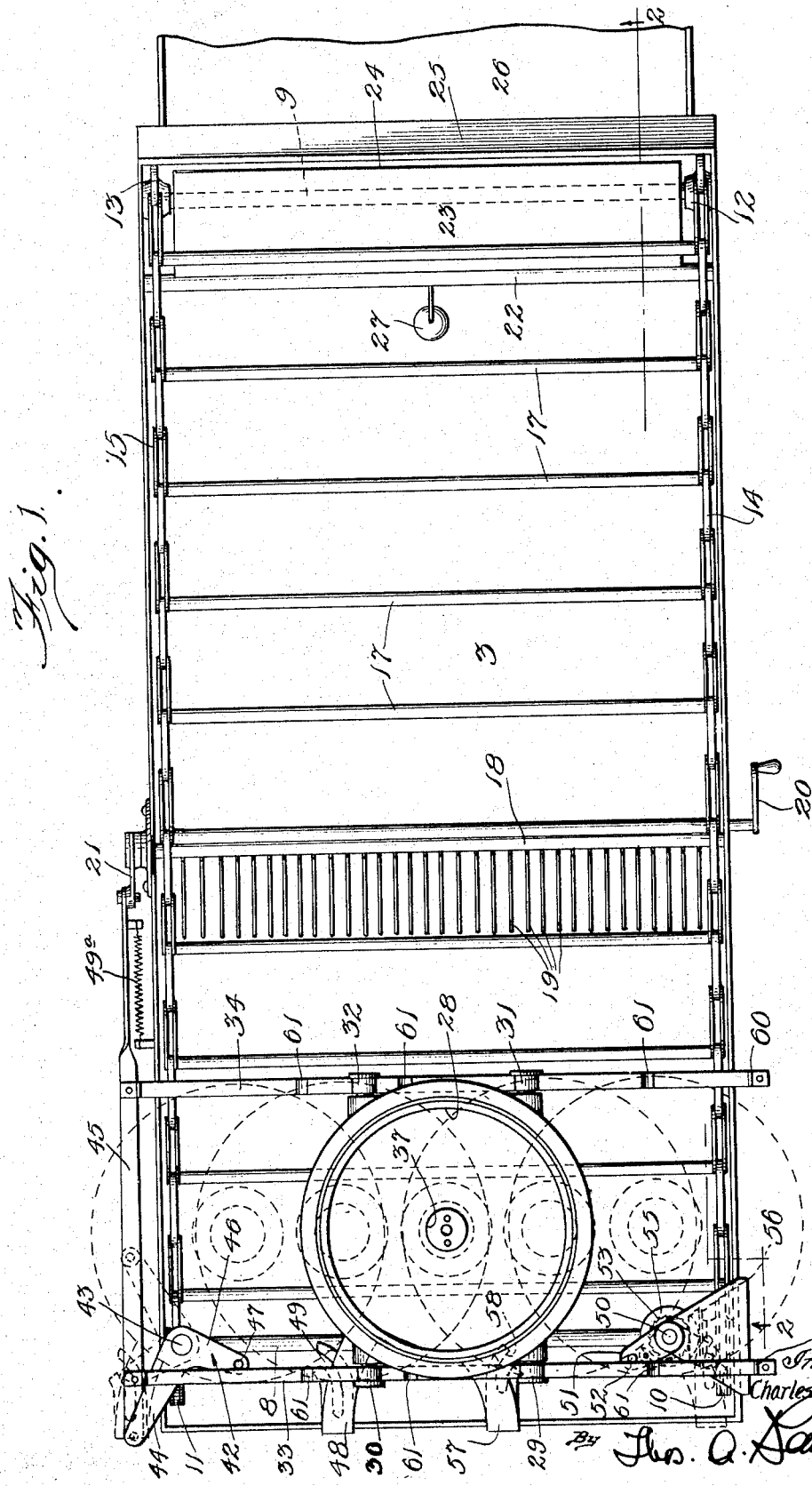

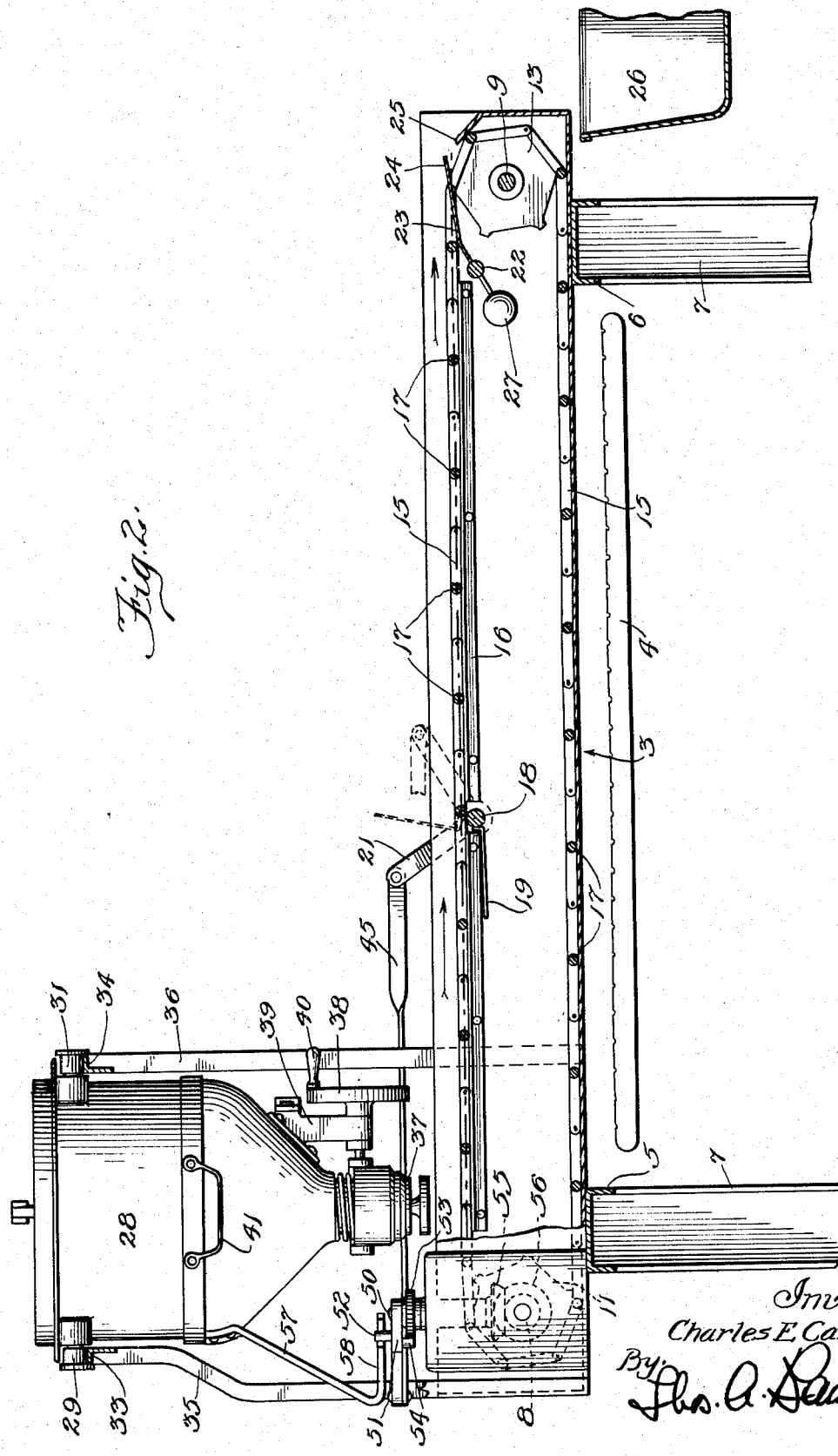

Patented Sept. 30, 1930

1,776,781

UNITED STATES PATENT OFFICE

CHARLES E. CARPENTER, OF CHICAGO, ILLINOIS

DOUGHNUT MACHINE AND THE LIKE

Application filed July 13, 1929. Serial No. 377,960.

This invention has to do with improvements in machines for forming and cooking doughnuts and the like. The machine herein disclosed is especially intended for the forming and cooking of doughnuts in relatively large quantities, as, for example, in commercial operations. Nevertheless, it will appear that certain features of the invention are not limited to use in connection with these large machines.

One object of the invention is to provide a machine of such construction that the hopper and doughnut former can be shifted back and forth into different positions with respect to a suitable conveyor or carrying device by which the doughnuts are advanced through the frying pan. In this connection, it is an object to make provision for placing the doughnuts in rows extending across the machine, together with means for causing the doughnuts so placed to be advanced lengthwise of the machine after a row of freshly formed doughnuts has been placed in position.

A further feature of the invention relates to the provision of a simplified and improved construction of device for raising the finished doughnuts out of the bath and delivering them from the end of the machine.

Another feature of the invention relates to the provision of an improved construction of turn-over device for turning the doughnuts after they have received the proper amount of frying on one side. This turn-over device is so constructed that it can be operated either automatically by the movements of the doughnut former, or can be operated manually by the manipulation of a special turn-over crank which is provided for the purpose.

Another feature of the invention relates to the provision of an improved construction of support for the dough hopper, for mounting the same above the frying pan and at the same time making provision for moving said hopper back and forth across the frying pan. This hopper, together with the mechanism for operating the valves and associated devices, constitutes a self-contained structure which can be readily set into place above the frying pan or can be readily removed therefrom as a unit and without interference with other working parts. Also the placement or removal of the hopper and associated parts with respect to the frying pan does not require the use of special tools or equipment.

Other objects and uses of the invention will appear from a detailed description of the same which consists in the features of construction and combinations of parts hereinafter described and claimed.

In the drawings:

Figure 1 shows a plan view of a machine embodying the features of the present invention; and Figure 2 shows a side view corresponding to Figure 1, the same being partially in section and taken substantially on the line 2—2 of Figure 1, looking in the direction of the arrows.

The machine illustrated includes a relatively large frying pan 3. The same is relatively shallow as shown in Figure 2, but is of sufficient length and width to establish the desired capacity of machine as best shown in Figure 1. The width of the machine depends upon the number of doughnuts which are to be placed side by side. The machine illustrated is of capacity to accommodate five doughnuts, as shown by the five circles at the left hand side of Figure 1. The machine could be made of greater or less width as desired. The length of the machine is dictated by the total distance and time of travel from the time the freshly formed batches of dough are delivered into the grease until the complete doughnuts are delivered therefrom at the end of the operation. The particular machine illustrated is of sufficient length to accommodate nine groups of frying doughnuts, besides the group which is being delivered from the end of the machine.

The pan 3 is heated in any convenient manner, as, for example, by a gas burner 4 located beneath the same. Also, said pan is conveniently supported by the cross members 5 and 6, located beneath its end portions and supported by the legs 7.

At the front end of the pan there is a cross shaft 8 and at its rear end there is another cross shaft 9. These shafts are journaled in suitable bearings within the pan. The shaft 8 carries sprocket wheels 10 and 11, and the shaft 9 carries sprocket wheels 12 and 13; and the flight chain 14 travels over the sprockets 10 and 12 and the flight chain 15 travels over the sprockets 11 and 13. The bottom or return sides of the chains ride on the floor of the pan 3 as is clearly shown in Figure 2. The top sides of the chains travel on angle brackets 16 (see Fig. 2) which are secured to the side walls of the pan 3 with their horizontal arms reaching outwardly into the pan a sufficient distance to establish track-ways upon which the top sides of the chains can travel. This is clearly evident from Figure 2.

Flights or cross bars 17 reach between the companion links of the two chains 14 and 15 so that as the chains travel along said flights are swept lengthwise of the pan 3. On the top halves of the chains these flights travel towards the right in Figures 1 and 2.

The pan is intended to be filled with grease substantially up to the position of the flights 17 so that the doughnuts floating in the grease will be properly advanced by the travel of the flights in the direction of the arrows in Figure 2.

The doughnuts are delivered in rows between the flights at the right hand end of the pan. As the chain travels in the direction of the arrows of Figure 2, the doughnuts are carried towards the right. Substantially at the middle or central portion of the pan the doughnuts are turned over so as to commence the frying operation on the other sides. This frying then continues as the doughnuts are carried towards the right until the right hand end of the machine is reached, whereupon the doughnuts are delivered from the pan.

The turn-over device illustrated includes a cross shaft 18 reaching across the pan between the two side walls thereof. This cross shaft 18 has a series of fingers 19 which extend out towards the left in Figures 1 and 2 and normally occupies a substantially horizontal position low enough down to insure a travel of the floating doughnuts to a position immediately above said fingers 19. At the proper time, namely when one of the cross rods or flights 17 is directly above the shaft 18, the travel of the chains being arrested, the shaft 18 is rocked in a clockwise direction through approximately 90° of movement or somewhat more. This will raise the fingers up into the dotted line position of Figure 2, so that the doughnuts will be advanced into the leading space between two of the rods or flights 17, and delivered down on to the surface of the grease in turn-over condition.

The shaft 18 can be manipulated manually by a crank 20 located on the end thereof nearest to the operator. In some cases it may be desirable to use an automatic operation of the turn-over device. For this purpose another crank 21 is shown on the other or far end of the shaft 18, which crank 21, can be connected to a suitable device for automatic operation as will be presently explained.

At the delivery or right hand end of the machine there is another transverse shaft 22 which is journaled in the side walls of the pan. This shaft 22 carries a sheet metal plate 23 which extends towards the right and reaches upwardly at a slight angle. The extreme edge 24 of this plate occupies a position close to the upper edge of a delivery chute 25. The delivery chute 25 constitutes in reality an upwardly and inwardly reaching extension of the end wall of the pan 3. A suitable receiving hopper 26 is placed at the end of the machine at the position to receive the doughnuts as they slide over the chute 25.

There is a counter weight 27 connected to the shaft 22 and reaching into the pan 3, which counter weight tends to retain the plate 23 in the raised position illustrated in Figure 2.

Nevertheless, as the flights 17 travel towards the right in Figure 2 they are able to slide over the plate 23, depressing the same slightly, and at the same time compelling the doughnuts to slide over the plate 23 and be delivered above the chute 25. The depression of the plate 23 in this manner also allows the flight 17 to get past the plate 23 and pass on to the sprocket wheels 12 and 13.

Located at the other end of the machine from the delivery end is a dough-batch feeder and doughnut former for dropping the batches of dough into the grease in the frying pan. This includes a hopper 28 having at its upper end the four rollers 29, 30, 31, and 32 travelling on the horizontal transversely extending tracks 33 and 34 respectively. These tracks are carried by the vertical stands or posts 35 and 36 which in turn have their lower ends suitably connected to the frying pan. The lower portion of this hopper is drawn inwardly on a taper in the usual manner and terminates in a neck or throat 37. The formed dough batches are delivered from the lower end of this throat or neck. A crank wheel 38 is journaled in a bracket 39 which depends from the hopper structure. Said crank wheel 38 is provided with a crank handle 40 by means of which it can be easily rotated by the right hand of an operator looking toward the machine in the direction of Figure 2. There is another handle 41 connected to the belly of the hopper 28 and by means of which said hopper can be readily shifted back and forth on the rails 33 and 34.

Suitable operating and valve mechanism is provided in conjunction with the hopper and throat 37 so that for each revolution of the crank wheel 38 there is formed and delivered from the lower end of the throat a doughnut batch. By turning the crank wheel 38 through a complete revolution there will be delivered one doughnut batch which will drop down into the frying pan beneath, whereupon the hopper can be shifted away from the operator the proper distance as indicated by the successive circles in Figure 1. Thereupon the crank wheel can be given another complete revolution and another doughnut batch will be formed and delivered into the grease. In this manner the successive doughnut batches are delivered in a row across the machine as indicated by the successive dotted line circles in Figure 1.

Means are provided for causing the turnover device shaft 18 to be rocked at the completion of the travel of the hopper away from the operator as just explained, and means are also provided for advancing the chains 14 and 15 together with the connected flights 17 towards the right in Figure 1, so as to carry the frying doughnuts with them, these movements being performed at the completion of the return travel of the hopper upon pulling the same back towards the operator.

For the above purpose there is provided a horizontal bell crank 42 pivoted to a stationary part at the point 43 at the further corner of the machine. This bell crank normally stands in the position shown by full lines in Figure 1. In this position one of its arms 44 which is connected to the crank 41 by a link 45 serves to retain the rock-shaft 18 in its normal position and with the fingers 19 horizontal. In this position also the other arm 46 of the bell crank reaches out towards the position of the hopper moving towards it.

The arm 46 has a pin 47. The hopper 28 has a downwardly depending bracket arm 48, the lower end of which is turned inwardly in a horizontal direction so as to lie across the path of swing of the pin 47 as the bell crank 42 is rocked. This lower portion 49 of the arm 48 is longitudinally slotted, the slot whereof has its entering end curved as shown in Fig. 1. The result of this arrangement is that as the hopper is forced away from the operator in Figure 1, when the lower portion of the arm 48 reaches the position of the pin 47, the slot 49 will receive said pin and the continued movement of the hopper will cause the bell crank 42 to swing in a clock-wise direction when viewed as in Figure 1. This will compel the rock-shaft 18 to turn through a sufficient angle to swing the fingers 19 upwards, carrying with them the partially fried doughnuts, and turning them over and delivering them into the leading space between the flights of chain. This will empty the space previously occupied by said doughnuts. As soon as the return movement of the hopper commences the pin 47 will be drawn toward the hopper harmoniously with the return movement of the hopper until the bell crank 42 has swung around far enough to permit disengagement of the pin 47 from the slot 49. When this condition is reached the fingers 19 of the turnover device will have been restored to their horizontal position and the pin 47 will be disengaged from the slot 49 so that the hopper may be fully returned to its initial position. If desired, a spring 49ª may be provided to assist in restoring the link 45 and crank 21 to the normal or initial position.

At the near corner of the frying pan there is journaled a vertical stub shaft 50. On the upper end thereof there is journaled a crank arm 51 which has a pin 52. A ratchet wheel 53 is secured to the stub shaft 50, and the arm 51 has a dog or pawl 54 which engages the ratchet wheel 53 to rotate the same and also the stub shaft 50 in a counter-clockwise direction when the arm 51 is forced towards the observer in Figure 1. On the return movement of the arm 51 said pawl or dog will ride free and allow the shaft 50 to remain in the position to which it had been moved.

The lower end of the shaft 50 carries a bevel gear 55 which in turn meshes with a bevel gear 56 on the shaft 8. The arrangement is such that the swinging of the arm 51 causes the shaft 8 to rotate in a clockwise direction when viewed as in Figure 2, and thereby to advance the sprocket wheels and chains.

The hopper 28 carries another downwardly extending arm 57, the lower end of which is in-turned as shown at 58 and is slotted in a manner similar to the slot 49 already referred to. The slot of the arm 58 engages the pin 52 of the arm 51 as the hopper is drawn back to its original position, thereby swinging the arm 51 towards the operator and rocking the shaft 50 and thereby advancing the chains and flights. The amount of this advancement is equal to the distance between two flights so that the frying doughnuts are advanced one stage towards the right in Figure 1.

Upon again forcing the hopper away from the operator the pin 52 will continue to engage the slotted arm 58 so that the arm 51 will be drawn back to the full line position of Figure 1, ready for another movement the next time the hopper is restored to its position closest to the operator.

If it is desired, the tracks 33 and 34 may be provided with stops 59 and 60 for limiting the hopper movement towards the operator; and notches 61 may be formed in said rails at the appropriate positions to momentarily arrest the hopper movement at the correct positions for dropping the successive doughnuts.

It will be understood that the details of construction of the hopper 28 together with the doughnut forming and feeding valves and devices are not disclosed in detail herein, since they constitute the subject matter of another application for Letters Patent of the United States on doughnut feeders, executed by me of even date herewith.

While I have herein shown and described only a single embodiment of the features of my present invention, still I do not intend to limit myself thereto except as I may do so in the claims.

I claim:

1. In a machine of the class described, the combination of a relatively long shallow frying pan, a transverse shaft at each end thereof, sprocket wheels on said shafts at the corners of the pan, flight chains at the two sides of the pan and traveling over the companion sprocket wheels of the two shafts, flights extending across the width of the pan between companion links of the chains, a turn-over shaft extending across the pan adjacent to the top runs of the flight chains, fingers connected to said turn-over shaft and lying within a common plane and adapted to reach up between consecutive flights of the top runs of the chains to raise and turn over doughnuts when said shaft is rocked, a pair of horizontal rails located above the pan at one end thereof, a dough hopper supported by and traveling upon said rails, said dough hopper being provided with a downwardly depending delivery throat together with suitable dough batch forming and delivering mechanism, a bell crank lever journaled with respect to the pan adjacent to one extreme limit of transverse movement of said hopper, an operating connection therefrom to the turn-over device rock shaft operative to rock said shaft when said bell crank is rocked, means in conjunction with the hopper for rocking said bell crank at one extreme limit of movement of the hopper, another bell crank pivotally connected with respect to the pan, an operative connection therefrom to one of the sprocket shafts for advancing the same in the sprocket feeding direction when said bell crank is rocked in one direction, means in conjunction with the hopper for rocking said bell crank for the above purpose at the other extreme limit of hopper movement, and means for delivering completed doughnuts from the end of the pan opposite to the location of said hopper, substantially as described.

2. In a machine of the class described, the combination of a frying pan, a pair of horizontal flight chains located within said pan and traveling adjacent to the side walls thereof, flights extending across the pan between companion links of said chains, a suitable turn-over device located in the central portion of the pan and including a series of supporting fingers normally lying in a horizontal position beneath the top runs of the flights, and adapted to swing upwardly and forwardly to turn over a series of doughnuts when said turn-over device is operated, a pair of rails extending across the pan adjacent to one end thereof, a hopper mounted upon and supported by said rails to travel back and forth across the pan, suitable dough batch forming and delivering device in conjunction with said hopper, means for operating the turn-over device when the hopper reaches one extreme limit of movement transversely of the pan, means for advancing the flights when the hopper reaches the other extreme limit of movement transversely of the pan, and means for delivering completed doughnuts from the end of the pan farthest from the location of said rails and hopper, substantially as described.

3. In a machine of the class described, the combination of a frying pan, doughnut advancing mechanism located therein and including a series of transversely extending flights adapted to travel length-wise of the pan and thereby advance the frying doughnuts, a turn-over device located in the central portion of the pan and adapted to receive and raise and turn over doughnuts at a position intermediate between a pair of flights, a doughhopper located above the pan at one end thereof, means for supporting said hopper in such position and permitting back and forth movement of the hopper transversely with respect to the pan, said hopper including suitable doughnut forming and delivering devices for dropping doughnuts into the pan, means in conjunction with said hopper and turn-over device for operating the turn-over device at one extreme limit of movement of the hopper, means in conjunction with said hopper and flight carrier operative effectively to advance the flight carrier at the other extreme limit of movement of the hopper, and means for delivering completed doughnuts from the other end of the pan, substantially as described.

4. In a machine of the class described, the combination of a frying pan, means for intermittently advancing doughnuts lengthwise thereof, means for turning over said doughnuts in the central portion of the pan, a dough hopper mounted for movement transversely of the pan adjacent to one end thereof, suitable doughnut forming and delivering mechanism in conjunction with said hopper, means in conjunction with the hopper operative effectively to actuate the turn-over device when the hopper reaches one extreme limit of movement, means operative effectively to actuate the doughnut advancing mechanism when the hopper reaches the other limit of its movement, and means for delivering completed doughnuts from the end of the pan opposite to that where said hopper is located, substantially as described.

5. In a machine of the class described, the combination of a frying pan, means for intermittently advancing doughnuts lengthwise of said pan, means for turning over the frying doughnuts in the central portion of the pan, a dough hopper mounted for movement transversely of the pan adjacent to one end thereof, means in conjunction with said hopper for forming and delivering doughnuts into the pan, means for actuating the doughnut advancing mechanism when the hopper reaches one extreme limit of its movement, and means for delivering completed doughnuts from the pan at the end thereof farthest from the position of said hopper, substantially as described.

6. In a device of the class described, the combination of a frying pan, means for intermittently advancing frying doughnuts lengthwise of said pan, means for turning over said doughnuts in the central portion of the pan, a dough hopper mounted for movement transversely of said pan at one end thereof, said dough hopper including suitable doughnut forming and delivering devices, means in conjunction with the hopper for actuating the turn-over device at one extreme limit of movement of the hopper, and means for delivering completed doughnuts from the end of the pan opposite to the position of said hopper, substantially as described.

CHARLES E. CARPENTER.